United States Patent [19]

Johnsen et al.

[11] Patent Number: 4,693,897

[45] Date of Patent: Sep. 15, 1987

[54] STIMULATION AND ENHANCEMENT OF FEEDING IN HERBIVOROUS FISH

[75] Inventors: Peter B. Johnsen, Havertown, Pa.; Michael A. Adams, Haddonfield, N.J.

[73] Assignee: Monell Chemical Senses Center, Philadelphia, Pa.

[21] Appl. No.: 846,834

[22] Filed: Apr. 1, 1986

Related U.S. Application Data

[63] Continuation of Ser. No. 641,569, Aug. 16, 1984, abandoned.

[51] Int. Cl.⁴ ............................................. A23K 1/00
[52] U.S. Cl. ..................................................... 426/2
[58] Field of Search ..................... 426/2, 1, 623, 630, 426/807; 119/3

[56] References Cited

FOREIGN PATENT DOCUMENTS

| 3306141 | 5/1984 | Fed. Rep. of Germany | 426/650 |
| 0127197 | 11/1978 | Japan | 426/1 |
| 0022919 | 8/1979 | Japan | 426/2 |
| 0063147 | 4/1984 | Japan | 426/1 |

OTHER PUBLICATIONS

Chemosensitivity of Herbivorous Fish, Proceedings of 8th International Symposium on Olfaction & Taste, Aug. 23–26, 1983.
Yoshii et al., "Gustatory Responses of Eal Palatine Receptors to Amino Acids and Carboxylic Acids" J. Gen. Physiol., vol. 74, pp. 301–317 (1979).
Uhazt et al., "Schistosoma Mansuni Identification of Chemicals that Attract its Snail Vector Biomphalaria Glabrata" Science, vol. 201, pp. 924–926 (1978).
Holland, "Chemosensory Orientation to Food by a Hawaiian Goatfish" J. Chem. Ecol., vol. 4, pp. 173–186 (1978).
Kiyohara et al., Gustatory Responses in the Puffer-II, Single Fiber Analysis Bull., Jpn. Soc. Sci. Fish., vol. 41, pp. 383–391 (1975).
Kanazawa et al., "Nutritional Requirements of Prawn I Feeding on Artificial Diet" Bull. of the Jpn. Soc. of Sci. Fisheries, vol. 36, pp. 949–954 (1970) Abstract only.
Sun et al., "Rhipocephalin and Rhipocephalus: Toxic Feeding Deterrants" Tetrahedron Letters pp. 685–688 (1979).
Mauri et al., "Gustatory Specificity for Amino Acids in the Facial Taste System of the Carp" J. Comp. Physiol., vol. 59, pp. 299–308 (1983).
Johnsen et al., "The Chemosensitivity of Herbivorous Fish" Chemical Senses, vol. 8, No. 3 (1984 pp. 252–253).
Maeku "Identification of the Gustary Feeding Stimulants" Chemoreception in Fishes Elsevier Publisher, NY (1982) pp. 275–291.
Caprio "High Sensitivity of Catfish Taste Receptors to Amino Acids" Comp. Biochem. Physiol., vol. 52A (1975) pp. 247–251.
Kiyshara et al., High Sensitivity of Minnow Gustatory Receptors to Amino Acids, Physiol. Behav., vol. 27 (1981) pp. 1103–1108.

*Primary Examiner*—R. B. Penland
*Attorney, Agent, or Firm*—Woodcock Washburn Kurtz Mackiewicz & Norris

[57] ABSTRACT

Methods for stimulating or enhancing feeding of herbivorous fish are disclosed comprising presenting the fish with an edible composition comprising a stimulatory amount of at least one of aspartic acid, glutamic acid or citric acid. In accordance with a preferred embodiment, preference spectra of herbivorous fish are determined and used to tailor feeding materials for improved, stimulated or enhanced feeding.

2 Claims, No Drawings

STIMULATION AND ENHANCEMENT OF FEEDING IN HERBIVOROUS FISH

This is a continuation of application Ser. No. 641,569, filed Aug. 16, 1984, now abandoned.

BACKGROUND OF THE INVENTION

The present invention is directed to methods for increasing the intensity, degree or range of feeding of herbivorous fish. More particularly, the instant invention is directed to methods for stimulating or enhancing feeding in such fish and to compositions useful for causing such stimulation or enhancement.

It has been generally recognized that chemical control of feeding can be an important modulator of physiological well-being in many animal species. Substances present in the diet of an animal may act as feeding stimulants to attract the attention of the animal to a foodstuff or to encourage foraging. Substances may also act as a feeding enhancer to induce an animal to eat more than it normally would or to eat foodstuffs which are not normally consumed or preferred by that animal. The presence or absence of these substances in the diet may determine whether a food item is eaten or rejected by an animal and, to some extent, the quantity consumed. In spite of this general knowledge, however, experimental knowledge which would permit ellucidation of chemical regulation mechanisms of herbivorous fish feeding is sparse.

Fish are believed to be able to detect food by a variety of sensory mechanisms including vision and the chemical senses of olfaction and taste. Taste is believed generally to play a key role in determining whether a potential food item is swallowed or rejected. While chemoreception as a general phenomenon and chemical mediation of gustation and olfaction in particular have been investigated for several species of carnivorous fish, the taste properties and preferences of herbivorous fish have been almost totally ignored.

A. M. Mackie in "Identification of the Gustatory Feeding Stimulants", *Chemoreception in Fishes*, T. J. Hara, ed., Elsevier New York (1982), pp. 275–291 has concluded that the taste system of carnivorous fish appears to be well-tuned for detecting the presence of certain animal tissue via amino acid content. It was concluded that due to the chemical similarity of prey items in carnivores' diet, their taste receptors need not have the ability to respond to a variety of chemicals having widely differing structures; most of the information concerning the suitability of a food item is believed able to be conveyed by a few amino acids.

The taste system of herbivorous fish, however, is expected to be more complex since the diet of such fish is restricted to plant matter. Accordingly, while amino acids of plant tissue might be expected to be sufficient stimulus to attract herbivorous fish, it is expected that the fish, once attracted, might use a second sensitivity such as, for example, the response to a bitter taste of an alkaloid toxin, to avoid ingesting plants which produce potentially harmful physiological effects. For example, it has been found by Sun et al. in "Rhipocephalin and Rhipocephalinal; Toxic Feeding Deterrents From the Tropical Marine Alga Rhipocephalus phoenix", *Tetrahedron Letters*, pp. 685–688 (1979) that when certain plant-derived feeding deterrents were incorporated into food pellets, the pellets were rejected by certain species of herbivorous fish.

Despite the apparent complexities of studying the chemosensory behavior of herbivorous fish, a long-felt need exists for feeding stimulants and enhancers for herbivorous fish since herbivorous fish are widely employed in aquaculture as a human food source. It is generally acknowledged that animals low on the food chain, i.e. herbivores, can be produced much more economically than can animals higher on the food chain i.e., carnivores. By having an understanding of the regulatory mechanism of food intake in herbivorous fish, and by having knowledge of methods for increasing feeding in such fish and for compositions capable of stimulating such increase, it would likely be possible to manipulate the feeding behavior of the fish in a manner that would increase food consumption and growth, would encourage feeding on low quality foodstuffs, and would, accordingly, increase the food supply available to humanity.

SUMMARY OF THE INVENTION

It has now been found that feeding in herbivorous fish can be stimulated or enhanced by presenting the fish with a composition comprising a stimulating or enhancing amount of at least one of aspartic acid and glutamic acid. It has also been found that certain polycarboxylic acids, especially citric acid, enhance feeding in such fish. Combinations of the foregoing, especially combinations of all three acids, are also preferred. In accordance with a preferred embodiment, such acids are added to a foodstuff for herbivorous fish and are effective in stimulating or enhancing feeding in fish such as Tilapia.

A method has also been found for determining a preference spectrum for a herbivorous fish species by contacting the chemical sensors of fish of the species with a variety of amino and other organic acids and by determining the effects upon feeding of such acids. Carriers, such as foodstuffs, are treated with the acids comprising the preference spectrum are then used to feed fish.

Compositions effective to stimulate or enhance feeding in herbivorous fish comprising at least one of aspartic acid, glutamic acid and citric acid in a carrier acceptable to fish have been discovered as well.

OBJECTS OF THE INVENTION

It is a principal object of the instant invention to improve feeding in herbivorous fish.

Yet another object is to provide methods for causing improvement in the utilization of food resources in aquaculture for herbivorous fish.

Yet another object of the instant invention is to provide methods for stimulating or enhancing feeding by herbivorous fish by exposing the fish to compositions enriched in one or more of aspartic acid, glutamic acid and citric acid.

A further object of the invention is to provide synergistic compositions for stimulating or enhancing the feeding behavior of herbivorous fish such as Tilapia, grass carp and other by combining an acceptable carrier with glutamic, aspartic and/or citric acids.

Methods for determining preference spectra for fish and for improving feeding by enriching foodstuffs with preferred compositions are also objects of the invention.

DETAILED DESCRIPTION OF THE INVENTION

Numerous authors have tested the stimulatory effectiveness of various amino acids upon carnivorous fish. Thus, Caprio in "High Sensitivity of Catfish Taste Receptors to Amino Acids", [Comp. Biochem. Physiol., 52A: pp. 247-251 (1975); Holland in "Chemosensory Orientation to Food by a Hawaiian Goatfish", *J. Chem. Ecol.*, 4: pp. 173-186 (1978); Kiyohara et al. in "Gustatory Responses in the Puffer-II, Single Fiber Analysis", *Bull. Jpn. Soc. Sci. Fish.*, 41: pp. 383-391 (1975); Kiyohara et al. in "High Sensitivity of Minnow Gustatory Receptors to Amino Acids", *Physiol. Behav.*, 26: pp. 1103-1108 (1981); Marui et al. in "Gustatory Specificity for Amino Acids in the Facial Taste System of the Carp", *J. Comp. Physiol.*, 153: pp. 299-308 (1983); and Yoshii et al. in "Gustatory Responses of Eel Palatine Receptors to Amino Acids and Carboxylic Acids", *J. Gen. Physiol.*, 74: pp. 301-317 (1979), inter alia have collected data on carnivorous fish.

It has become apparent to the inventors that, in general, carnivorous fish prefer amino acids such as alanine, glutamine, glycine, proline, arginine, taurine and betaine. The inventors have discovered, however, that herbivorous fish such as Tilapia and, it is believed, a wide variety of other herbivorous fish, prefer polyacidic amino acids such as glutamic and aspartic acids more than any of the other amino acids. It has now also been found that certain polycarboxylic, organic acids, especially citric acid, can stimulate or enhance the feeding activity of herbivorous fish either alone or in combination with glutamic and/or aspartic acids.

In accordance with the foregoing discoveries, it has been found to be convenient and effective to stimulate or enhance the feeding of herbivorous fish by presenting them with acceptable (preferably edible) materials comprising a stimulatory or enhancing amount of at least one of aspartic, glutamic or citric acids.

Compositions comprising acceptable carriers together with enhancing or stimulatory amounts of one or more of aspartic, glutamic or citric acids are useful for stimulating fish feeding. It is preferred that additional quantities of citric acid in amounts sufficient further to stimulate or enhance the feeding of herbivorous fish be added to compositions comprising the amino acids.

In order to stimulate or enhance the feeding of herbivorous fish, compositions in accordance with the instant invention are presented to the fish preferably in association with fish foodstuffs. Thus, stimulatory or enhancing compositions may be mixed with prepared fish food or with prepared or collected herbaceous material, and given to the fish. The fish may thus be caused to be stimulated to eat and/or to broaden their feeding spectrum through enhancement, that is, to feed upon plant matter which is not ordinarily the food of choice for the particular fish or to eat more food than normal. In the case of Tilapia, it is believed now to be possible to stimulate feeding on rice straw, a low-cost foodstuff, through use of the present invention. Moreover, it is believed that additional quantities of plant matter may be consumed by individual fish causing improved weight gain and feeding efficiency. Improvements in aquaculture follow with concomitant benefits to humans whose diets depend upon the fish products of such aquaculture.

Wile the aspartic, glutamic and citric acids have been demonstrated to have stimulatory and/or enhancing effects on the feeding of Tilapia and, it is believed, grass carp, other herbivorous fish are also believed to be subject to stimulation and/or enhancement of feeding in accordance with practice of the present invention. While many such fish may show similar enhancement or stimulation by the same acids which effect Tilapia and grass carp, other groups of amino and polycarboxylic acids may be effective with other herbivores. Accordingly, it is a preferred embodiment of the present invention to determine a preference spectrum for a species of herbivorous fish and to accomplish feeding of that species by preparing a carrier or feeding material edible by the fish and enriched in at least one of the acids comprising the preference spectrum. The preference spectrum is determined through contacting the chemosensors of fish of the species in question with a plurality of amino acids and/or organic polycarboxylic acids and by measuring the biological response of the sensors or of the fish to the acids to effect quantitation of that response.

Acids, such as aspartic acid, glutamic acid, citric acid and the like may be added to foodstuffs or other acceptable carriers to effect stimulation or enhancement of fish feeding. Moreover, pure acids may be added to plant extracts, foods or derivatives further to improve the effectiveness thereof.

While the preference profile of Tilapia was found to comprise certain acidic amino acids and citric acid in the main, and while grass carp has also been found to prefer such acids, it is possible that other herbivorous fish may respond to different amino acids, carboxylic acids, polycarboxylic acids or other acidic materials. Moreover, it is also possible that materials having different properties such as sugars, salts, proteins, lipids, carbohydrates, and other materials may exhibit enhancing or stimulatory effects for certain species of herbivorous fish. It is, accordingly, within the spirit of this invention to determine preference spectra for herbivorous fish to these materials as well. Having determined the preference spectrum for a particular species of herbivorous fish, attendance to feeding them with foodstuffs having admixtures of effective amounts of at least some of the materials comprising the preference spectra can be accomplished to result in improvements in aquaculture and in fish food production. The preparation of acceptable carriers for stimulatory and/or enhancing composition in accordance with this embodiment is also comprehended hereby.

Bioassay of the sensory response of Tilapia to determine its preference spectrum was conducted with *Tilapia zillii* 60 to 110 mm in length. Each fish was individually housed in a ten-gallon aquarium equipped with an aerator-filter and heater. Water temperature was maintained between 25.5° and 26.5° C. The fish were maintained on a 12 hour light/12 hour dark cycle and were tested once a day, Monday through Friday at noon, during the light period. The fish were fed a commercial, vegetable-based flake diet on Friday (after testing), Saturday and Sunday.

Romaine lettuce (a plant readily eaten by Tilapia) was selected for use in our studies because of its year-round availability and was purchased from commercial suppliers. The plant material was weighed and homogenized in a Waring blender prior to further processing. This homogenate is used directly to prepare a whole plant homogenate (WPH) for use as a bioassay standard or fractionated and extracted further.

Our fractionation and extraction method is one modified from Uhazy et al., "*Schistosoma mansoni:* Identification of chemicals that attract its snail vector *Biomphalaria glabrata.*", *Science,* 201, pp. 924–926 (1978). The aqueous plant homogenate (a 2:1 water-plant suspension, w/w) is centrifuged (6870×g, 30 min) to remove solids and the resulting supernatant liquid is filtered to provide further clarification of the solution. Proteins are precipitated by adding sufficient trichloroacetic acid to the preparation to make a 5% (w/v) solution. This solution is stirred at 0° C. for one hour and then centrifuged (6870×g, 30 min) to pellet the proteins. The supernatant is decanted and this protein-depicted liquid extracted five times with diethyl ether to remove lipids; the lipids can be recovered for bioassay by evaporating the ether, dissolving the residue in chloroform and partitioning the solution against water. Evaporation of the chloroform solution gives the lipid fraction. The aqueous residue from ether extraction is lyophilized and then chromatographed on a Dowex TM AG50X8 ion exchange column. Elution with 0.01N hydrochloric acid gives a fraction containing organic acids and sugars. A second elution with 4N NH$_4$OH produces an amino acid containing fraction. The fraction containing organic acids and sugars is lyophylized and rechromatographed on a DEAE-cellulose column. Elution with water gives a sugar fraction; subsequently organic acids can be eluted from the column by washing with 4N formic acid.

The standard method for our bioassay was to present test compounds to the fish in a disk-shaped agar matrix. The agar matrix material elicits little feeding activity of itself, as demonstrated by very little consumption in two-choice, blank versus blank, feeding tests. To reduce any possible effects of previous trials, tests were always conducted as two-choice experiments which allows direct comparison of consumption and preference between the two disks. Two percent agar (Difco Noble), colored green with food dye to mask natural pigments in plant extracts, was cast in a Petri dish in which were suspended 2.5 cm plastic rods. After the agar solidified, a circular cutter was used to punch out disks of agar which had the plastic rod protruding from them. The plastic rod was attached to a mounting bracket and this assembly lowered into the test tank. The mounting bracket holds both experimental and reference disks; the positions of the disks were randomized. The disks were weighed before and after a two hour test period and the weight differences used to calculate consumption and preference. A set of control disks was also placed into water for the two hour test period to permit water gain by the test disks to be accounted for. To test for feeding stimulus activity, the experimental disk contained the material of interest while a blank, agar alone, served as the reference. Preference for the experimental disk indicated that the compound was a feeding stimulus. Preference in our tests is calculated as mean percent preference and a Students t test was used to compare between the two means. In measuring the stimulatory efficacy of stimuli, the stimulus sample disk was presented with a disk containing 10% (weight to volume) whole plant homogenate as reference. Percent efficacy is calculated by mean percent preference for the experimental sample divided by the mean percent preference for the reference disk.

Various fractions, amino acids, polycarboxylic acids, other materials and combinations were caused to contact the chemosensors of Tilapia as given in Table I in accordance with the Bioassay. The concentration of test materials, reference material for comparison, number of subjects, preference percentage and statistical probability value (greater or less than 0.01) are given in the table as well. From this data, the preference profile for Tilapia was determined to comprise in the main glutamic acid, aspartic acid and citric acid.

TABLE 1

| Material | Reference | N | % Preference | p < 0.01 |
| --- | --- | --- | --- | --- |
| 0.01 M glutamic acid | blank | 14 | 76 ± (13) | y |
| 0.01 M aspartic acid | blank | 13 | 72 ± (19) | y |
| 0.01 M lysine | blank | 10 | 75 ± (16) | y |
| 0.01 M alanine | blank | 11 | 65 ± (13) | y |
| 0.01 M betaine | blank | 10 | 59 ± (13) | n |
| 0.01 M cysteine | blank | 14 | 51 ± (15) | n |
| 0.01 M glutamine | blank | 13 | 60 ± (18) | n |
| 0.01 M proline | blank | 14 | 54 ± (26) | n |
| 0.01 M asparagine | blank | 8 | 69 ± (19) | n |
| 0.01 M taurine | blank | 8 | 44 ± (10) | n |
| 0.01 M glutamic acid | 0.01 M aspartic acid | 12 | 60 ± (20) | n |
| 0.01 M glutamic acid | 0.01 M alanine | 14 | 72 ± (17) | y |
| 0.01 M lysine | 0.01 M alanine | 14 | 55 ± (28) | n |
| 0.01 M glucose | blank | 14 | 50 ± (17) | n |
| 0.01 M fructose | blank | 9 | 43 ± (22) | n |
| 0.01 M NaCl | blank | 10 | 51 ± (16) | n |
| 0.01 M citric acid | blank | 15 | 86 ± (9) | y |
| 0.01 M malic acid | blank | 14 | 56 ± (24) | n |
| 0.001 M citric acid | blank | 13 | 53 ± (24) | n |

Each fraction of the lettuce was assayed for feeding activity. Whole plant homogenate served as the standard of activity to which all other extracts were related qualitatively. It was found that if proteins were removed from the homogenate by precipitating them with trichloroacetic acid the fish fed on the extract to the same degree that they fed on whole lettuce. The lipid-containing ether extract had no feeding activity; the feeding activity resided entirely in the aqueous residue. Feeding assays were done on each of the chromotagraphed fractions, these indicated that feeding activity resided in the amino acid fraction.

The combined organic acids and sugars fractions showed no activity. Bioassay of the sugar and organic acid-containing subfractions revealed no stimulatory activity as well. Analysis of the organic acid content of Romaine lettuce showed that two acids, malic and citric, were present in fairly large quantities. It was found that pure malic acid had no effect on feeding but citric acid evoked a strong feeding preference (i.e., acts as a stimulant). The threshold of sensitivity of Tilapia to citric acid was found to lie near 0.01M for plain agar containing only citric acid. Citric acid added to lettuce-flavored agar caused Tilapia to consume more of this material than agar flavored only with lettuce. To this end, samples of lettuce flavored agar were presented to the fish; one sample contained only lettuce extract and the other contained lettuce extract plus 0.01M citric acid. It was found that the fish consumed twice as much of the sample containing added citric acid. Thus, the added citric acid seems to act behaviorally as a feeding enhancer in Tilapia. For agar flavored with lettuce extract the preference threshold is between $10^{-3}$M and $10^{-4}$M citric acid. The results are summarized in Table 2.

TABLE 2

| Material | Reference | N | % Preference | p < 0.01 |
|---|---|---|---|---|
| Lettuce homogenate: | | | | |
| blank | blank | 10 | 46 ± (22) | n |
| 1% lettuce | blank | 12 | 73 ± (10) | y |
| 10% lettuce | blank | 13 | 83 ± (16) | y |
| 10% lettuce | 1% lettuce | 8 | 71 ± (8) | y |
| Lettuce fractions: | | | | |
| protein depleted extract | blank | 18 | 83 ± (11) | y |
| lipid fraction | blank | 18 | 67 ± (27) | n |
| aqueous residue (w/o lipids) | blank | 15 | 84 ± (12) | y |
| total amino acids | blank | 18 | 94 ± (6) | y |
| organic acids and sugars | blank | 18 | 57 ± (20) | n |
| total organic acids | blank | 10 | 56 ± (17) | n |
| total sugars | blank | 11 | 48 ± (19) | n |
| Enhancement: | | | | |
| 0.01 $\underline{M}$ citric acid + 10% lettuce | 10% lettuce | 16 | 72 ± (15) | y |
| 0.01 $\underline{M}$ citric acid + 10% lettuce | 10% lettuce | 20 | 65 ± (24) | y |
| $10^{-4}$ $\underline{M}$ citric acid + 10% lettuce | 10% lettuce | 15 | 49 ± (23) | n |
| 0.01 $\underline{M}$ glutamic acid + 10% lettuce | 10% lettuce | 14 | 61 ± (24) | n |

What is claimed is:

1. A method of production of herbivorous Tilapia or herbivorous grass carp consisting essentially of feeding said Tilapia or said grass carp edible foodstuff admixed with a stimulating or enhancing amount of at least one of glutamic, aspartic or citric acids.

2. The method of claim 1 wherein said acid comprises citric acid.

* * * * *